United States Patent
Yeh

(10) Patent No.: US 9,142,953 B2
(45) Date of Patent: Sep. 22, 2015

(54) ELECTROSTATIC DISCHARGE PROTECTION APPARATUS AND ASSOCIATED METHOD

(71) Applicant: INDUSTRIAL TECHNOLOGY RESEARCH INSTITUTE, Chutung, Hsinchu (TW)

(72) Inventor: Chih-Ting Yeh, Zhudong Township, Hsinchu County (TW)

(73) Assignee: INDUSTRIAL TECHNOLOGY RESEARCH INSTITUTE, Chutung, Hsinchu (TW)

( * ) Notice: Subject to any disclaimer, the term of this patent is extended or adjusted under 35 U.S.C. 154(b) by 251 days.

(21) Appl. No.: 13/678,246

(22) Filed: Nov. 15, 2012

(65) Prior Publication Data

US 2013/0301172 A1     Nov. 14, 2013

(30) Foreign Application Priority Data

May 8, 2012  (TW) .............................. 101116410 A

(51) Int. Cl.
*H02H 9/04*     (2006.01)
(52) U.S. Cl.
CPC *H02H 9/04* (2013.01); *H02H 9/046* (2013.01)
(58) Field of Classification Search
CPC .................................. H02H 9/04; H02H 9/046
USPC .......................................................... 361/56
See application file for complete search history.

(56) References Cited

U.S. PATENT DOCUMENTS

| 5,959,820 | A | * | 9/1999 | Ker et al. .................... 361/111 |
| 6,008,684 | A | | 12/1999 | Ker et al. |
| 6,081,002 | A | | 6/2000 | Amerasekera et al. |
| 6,671,153 | B1 | | 12/2003 | Ker et al. |
| 7,242,561 | B2 | * | 7/2007 | Ker et al. ........................ 361/56 |

(Continued)

FOREIGN PATENT DOCUMENTS

| CN | 1414678 A | 4/2003 |
| CN | 1607664 | 4/2005 |
| CN | 1845388 | 10/2006 |
| TW | 200504990 | 2/2005 |

(Continued)

OTHER PUBLICATIONS

Wang, et al., "Design of Power-Rail ESD Clamp Circuit With Ultra-Low Standby Leakage Current in Nanoscale CMOS Technology", IEEE Journal of Solid-State Circuits, Mar. 2009, pp. 956-964, vol. 44. No. 3.

(Continued)

*Primary Examiner* — Thienvu Tran
*Assistant Examiner* — Kevin J Comber
(74) *Attorney, Agent, or Firm* — Muncy, Geissler, Olds & Lowe, P.C.

(57) ABSTRACT

An electrostatic discharge (ESD) protection apparatus, coupled between a first rail line and a second rail line, includes a clamp circuit and a detection circuit. The detection circuit includes an electronic element having an equivalent capacitance value, and a transistor having a gate, a first input and a second input respectively coupled to a first node, the first rail line and a drive terminal of the clamp circuit. In response to an ESD event, leakage currents pass between the first input and the gate and between the second input and the gate to equivalently form parasitic resistance therein, respectively. The parasitic resistances and the electronic element form a delay circuit to provide a drive voltage between the gate and the first input, and to provide a trigger current for conducting the clamp circuit, so that the first and second rail lines perform an ESD operation via the clamp circuit.

20 Claims, 7 Drawing Sheets

(56) References Cited

U.S. PATENT DOCUMENTS

| | | | |
|---|---|---|---|
| 7,508,639 | B2* | 3/2009 | Wu et al. .......................... 361/56 |
| 7,714,356 | B2* | 5/2010 | Abou-Khalil et al. ......... 257/173 |
| 2003/0058592 | A1 | 3/2003 | Hung et al. |
| 2003/0076636 | A1* | 4/2003 | Ker et al. ......................... 361/56 |
| 2007/0230073 | A1* | 10/2007 | Ker et al. ......................... 361/56 |
| 2009/0135533 | A1 | 5/2009 | Ker et al. |
| 2010/0296212 | A1 | 11/2010 | Liang et al. |
| 2012/0241900 | A1* | 9/2012 | Chen et al. .................... 257/503 |

FOREIGN PATENT DOCUMENTS

| | | |
|---|---|---|
| TW | 200804990 | 1/2008 |
| TW | 201104827 | 2/2011 |

OTHER PUBLICATIONS

Chiu, et al., "Ultra-Low-Leakage Power-Rail ESD Clamp Circuit in Nanoscale Low-Voltage CMOS Process", 47$^{th}$ Annual International Reliability Physics Symposium, 2009, pp. 750-753, Montreal.

Smith, et al., "A Low Leakage Low Cost-PMOS Based Power Supply Clamp with Active Feedback for ESD Protection in 65nm CMOS Technologies", EOS/ESD Symposium, 2005, 9 pages.

Jiang, et al., "Bi-Directional SCR Device with Dual-Triggered Mechanism for ESD Protection in Extended-Voltage-Swing I/O Application", Extended Abstracts of the 2009 International Conference on Solid State Devices and Materials, 2009, pp. 420-421, Sendai.

Mergens, et al., "Speed Optimized Diode-Triggered SCR (DTSCR) for RF ESD Protection of Ultra-Sensitive IC Nodes in Advanced Technologies", IEEE Transactions on Device and Materials Reliability, Sep. 2005, pp. 532-542, vol. 5., No. 3.

Ker, et al., "New Low-Leakage Power-Rail ESD Clamp Circuit in a 65-nm Low-Voltage CMOS Process", IEEE Transactions on Device and Materials Reliability, Sep. 2011, pp. 474-483.

* cited by examiner

ELECTROSTATIC DISCHARGE PROTECTION APPARATUS AND ASSOCIATED METHOD

CROSS-REFERENCE TO RELATED APPLICATION

This application claims the benefit of Taiwan application Serial No. 101116410, filed May 8, 2012, the disclosure of which is incorporated by reference herein in its entirety.

TECHNICAL FIELD

The disclosure relates to an electrostatic discharge (ESD) protection apparatus and associated method.

BACKGROUND

A power-rail electrostatic discharge (ESD) clamp circuit plays a critical role in achieving whole-chip ESD protection. A conventional ESD clamp circuit includes a clamp circuit and a detection circuit. The detection circuit detects whether an ESD event occurs on the power rails, and drives the clamp circuit to perform an ESD operation when the ESD event is detected.

As CMOS technologies approach a nanometer scale, for a transistor, a breakdown voltage of a gate oxide layer that is getting thinner and thinner also rapidly drops along with advancements in manufacturing techniques. Thus, a leakage current of the transistor device is correspondingly increased to significantly complicate ESD protection circuit designs. Therefore, there is a need for an ESD clamp circuit having a low leakage current for adapting to the ever-increasing CMOS technologies.

SUMMARY

The disclosure is directed to an electrostatic discharge (ESD) protection apparatus, which reduces a leakage current between rail lines in response to a normal circuit operation condition and provides a discharge path for performing an ESD operation in response to an ESD event.

According to one exemplary embodiment, an ESD protection apparatus including a clamp circuit and a detection circuit is provided. The clamp circuit is coupled between a first rail line and a second rail line respectively having a first reference voltage and a second reference voltage. The detection circuit includes a first node, an electronic element and a transistor. The electronic element has two terminals respectively coupled to the first node and the second rail line, and has an equivalent capacitance value. The transistor is coupled to the first node. In response to an ESD event triggered between the first and second rails lines, multiple leakage currents correspondingly pass between a first input and a gate and between a second input and the gate of the transistor, and respectively form a first parasitic resistance and a second parasitic resistance. The first and second parasitic resistances together with the electronic element form a delay circuit to provide a drive voltage between the gate and the first input for conducting the transistor, and to provide a trigger current for conducting the clamp circuit, so that the first and second rail lines perform an ESD operation via the clamp circuit.

According to another exemplary embodiment, a method of an ESD protection apparatus is provided. The method includes step of: providing a clamp circuit, the clamp circuit being coupled between a first rail line and a second rail line respectively having a first reference voltage and a second reference voltage; providing a detection circuit, the detection circuit including an electronic element and a transistor, the electronic element being coupled to a first node and having an equivalent capacitance value; in response to an ESD event triggered between the first and second rail lines, rendering multiple leakage currents to pass between a first input and a gate and between a second input and the gate of the transistor, and respectively in equivalence forming a first parasitic resistance and a second parasitic resistance therein; forming a delay circuit by the first and second parasitic resistances and the electronic element to provide a drive voltage between the gate and the first input; and in response to the drive voltage, conducting the transistor, and providing a trigger current for conducting the clamp circuit, so that the first and second rail lines perform an ESD operation via the clamp circuit.

Figure 1:
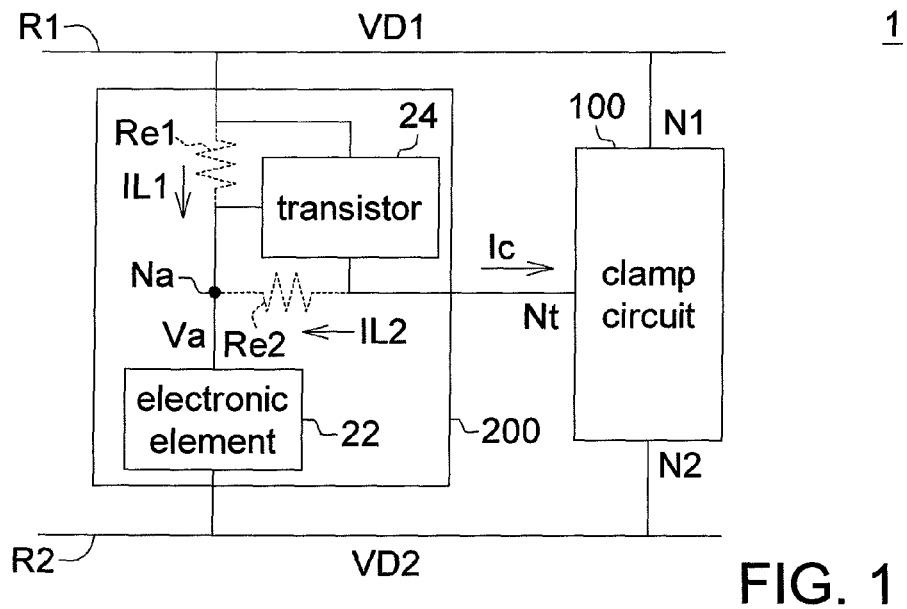
FIG. 1 is a block diagram of an electrostatic discharge (ESD) protection apparatus according to one exemplary embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

FIG. 1 shows a block diagram of an electrostatic discharge (ESD) protection apparatus according to one exemplary embodiment. For example, an ESD protection apparatus is applied to protect an internal operating circuit (not shown), and is coupled to between any two of power rails or input/output nodes of the internal operating circuit. The ESD protection apparatus provides a discharge path between the two power rails or input/output nodes, so that electrostatic charge between the rails or nodes can be discharged via the discharge path to provide the internal operating circuit with ESD protection.

For example, the ESD protection apparatus includes a clamp circuit 100 and a detection circuit 200. The clamp circuit 100 has a first terminal N1, a second terminal N2 and a drive terminal Nt. The first terminal N1 and the second terminal N2 are respectively coupled to a first rail line R1 and a second rail line R2, which respectively have a first reference voltage VD1 and a second reference voltage VD2.

The clamp circuit 100 is controlled by the detection circuit 200 to selectively provide a discharge path between the first rail line R1 and the second rail line R2. For example, the clamp circuit 100 is implemented by a silicon-controlled rectifier (SCR), a metal-oxide semiconductor field-effect transistor (MOSFET), or a field device.

The detection circuit 200 includes a node Na, an electronic element 22 and a transistor 24. The node Na has a voltage Va. The electronic element 22 has two terminals respectively coupled to the node Na and the second rail line R2. The transistor 24 has a gate, a first input and a second input, which are respectively coupled to the node Na, the first rail line R1 and the drive terminal Nt of the clamp circuit 100.

When an ESD event occurs between the first rail line R1 and the second rail line R2, levels of the first rail line R1 and the second rail line R2 drastically rise or drop within a very short period. In response to the ESD event triggered between the first rail line R1 and the second rail line R2, voltage differences are correspondingly generated between the first input and the gate and between the second input and the gate of the transistor 24, such that two leakage currents IL1 and IL2 respectively pass between the gate and the first input and between the gate and the second input of the transistor 24. Thus, a parasitic resistance Re1 is equivalently formed between the first input and the gate of the transistor 24, and a parasitic resistance Re2 is formed between the second input and the gate of the transistor 24.

The first parasitic resistance Re1 and the second parasitic resistance Re2 together with the electronic element 22 form a delay circuit, so that a level change of the voltage Va falls behind a level change of the first reference voltage VD1, and a drive voltage is correspondingly formed between the gate and the first input of the transistor 24. In an operation example, the ESD protection apparatus 1 is implemented by a 65 nm process, and resistance values of the parasitic resistance Re1 and Re2 are approximately in a level of mega-ohms (MΩ), and a time constant of the delay circuit is approximately in a level of microseconds (μs).

Further, in response to the drive voltage, the transistor 24 is enabled and provides a trigger current Ic for conducting the clamp circuit 100, such that the ESD event between the first rail line R1 and second rail line R2 is discharged via the clamp circuit 100. Accordingly, in the occurrence of an ESD event, the ESD protection apparatus 1 provides the internal operating circuit with effective ESD protection.

On the other hand, when a power event occurs between the first rail line R1 and the second rail line R2, the levels of the first rail line R1 and the second rail line R2 gradually increase from zero to a power voltage difference VDD–VSS. In response to the normal circuit operation condition triggered between the first rail line R1 and the second rail line R2, a slight voltage difference is correspondingly generated between the first input and the gate of the transistor 24. However, since the leakage current IL1 exists between the first input and the gate of the transistor 24, charge at the first input of the transistor 24 starts charging the electronic element 22 coupled to the gate of the transistor 24 by the leakage current IL1. As the transistor 24 charges the electronic element 22, a charge balance is reached, in which substantially no voltage difference exists between the first input and the gate of the transistor 24, and the transistor 24 then becomes turned-off.

It is concluded from the above description that, in the occurrence of a normal circuit operation condition, the clamp circuit 100 and the detection circuit 200 are both turned off. Thus, the discharge path provided between the first rail line R1 and the second rail line R2 by the ESD protection apparatus is substantially disconnected to prevent the happening of a leakage current, thereby enhancing power performance of the first rail line R1 and the second rail line R2.

Embodiments shall be given for further explaining the ESD protection apparatus of this embodiment.

Figure 2:
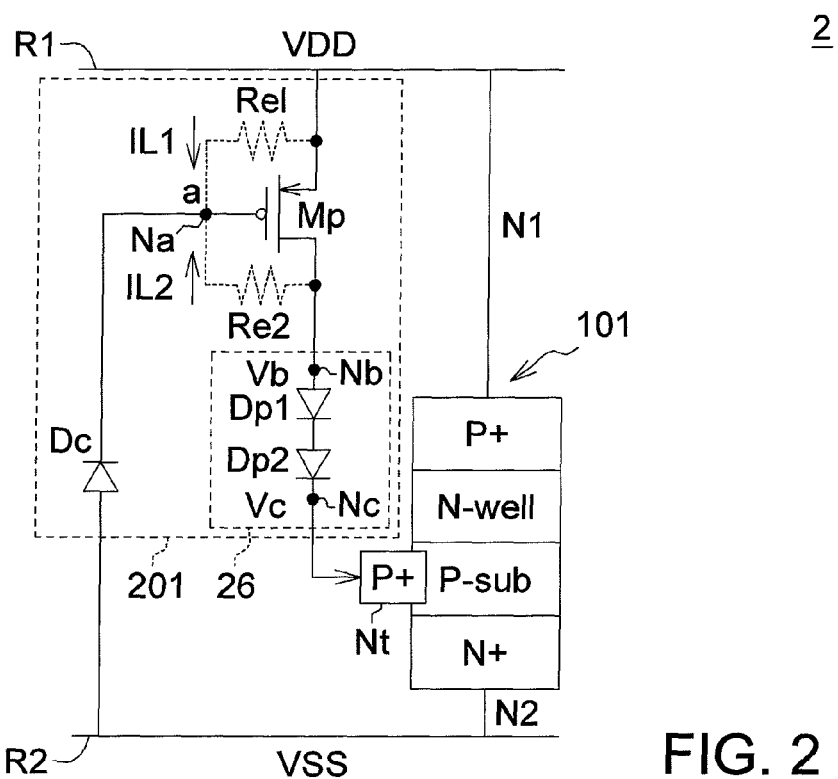
FIG. 2 is a schematic diagram of an ESD protection apparatus according to an exemplary embodiment.

FIG. 2 shows a schematic diagram of an ESD protection apparatus according to another exemplary embodiment. For example, an ESD protection apparatus includes a clamp circuit 101 and a detection circuit 201.

A first rail line R1 and a second rail line R2 respectively provide supply voltages VDD and VSS. For example, a voltage difference VDD–VSS between the supply voltages VDD and VSS is 1V, and the clamp circuit 101 is implemented by an SCR. Further, the clamp circuit 101 has a first input N1 and a second input N2, which are respectively an anode input and a cathode input of the SCR, and are respectively coupled to the first rail line R1 and the second rail line R2. A drive terminal Nt of the SCR corresponds to a P+ doped region.

The detection circuit 201 includes a transistor Mp, a node Na and an electronic element Dc. The transistor Mp is implemented by a P-type MOSFET, and has a gate, a source and a drain respectively coupled to the node Na, the first rail line R1 and the drive terminal Nt.

The electronic element Dc is implemented by a diode. The diode has a cathode and an anode respectively coupled to the node Na and the second rail line R2. In other words, in the occurrence of a normal circuit operation condition, a level at the anode of the diode is persistently maintained lower than a level at the cathode of the diode, such that the diode is reverse-biased. A capacitance value of the electronic element Dc is determined by junction capacitance of the diode. Similarly, in an ESD event in which the first reference voltage VD1 of the first rail line R1 and the second reference voltage VD2 of the second rail line R2 are respectively a high-level reference voltage and a low-level reference voltage, that is, the first rail line R1 is relatively positive to the second rail line R2, the diode is also reverse-biased, and the capacitance value of the electronic element Dc is determined by the junction capacitance of the diode.

The ESD protection apparatus further includes nodes Nb and Nc, and a level limiting circuit 26. The nodes Nb and Nc are respectively coupled to the drain of the transistor Mp and the drive terminal Nt. The level limiting circuit 26 is coupled between the nodes Nb and Nc, and determines a conducting voltage Von. When a cross voltage between the drain of the transistor Mp and the drive terminal Nt is lower than the conducting voltage Von, the level limiting circuit 26 substantially disconnects the drain of the transistor Mp from the drive terminal Nt. When the same cross voltage is greater than the conducting voltage Von, the level limiting circuit 26 substantially connects the drain of the transistor Mp to the drive terminal Nt. For example, the level limiting circuit 26 is implemented by a diode unit, which includes one or more than one serially connected diodes for correspondingly determining the conducting voltage Von.

Taking an operation example for instance, the value of the conducting voltage Von is substantially greater than or equal to the voltage difference VDD−VSS between the power voltages VDD and VSS. Assuming the voltage difference VDD−VSS is 1V, the level limiting circuit 26 substantially includes two serially connected diodes correspondingly having a conducting voltage of 0.7V. In other words, a value of the conducting voltage Von determined by the level limiting circuit 26 equals 1.4V, which is substantially greater than the voltage difference VDD−VSS. Hence, in the occurrence of a normal circuit operation condition, the level limiting circuit 26 ensures that the level limiting circuit 26 is maintained as turned-off, so as to prevent a malfunction of the detection circuit 201 from driving the clamp circuit 101 under a normal circuit operation condition.

Figure 3:
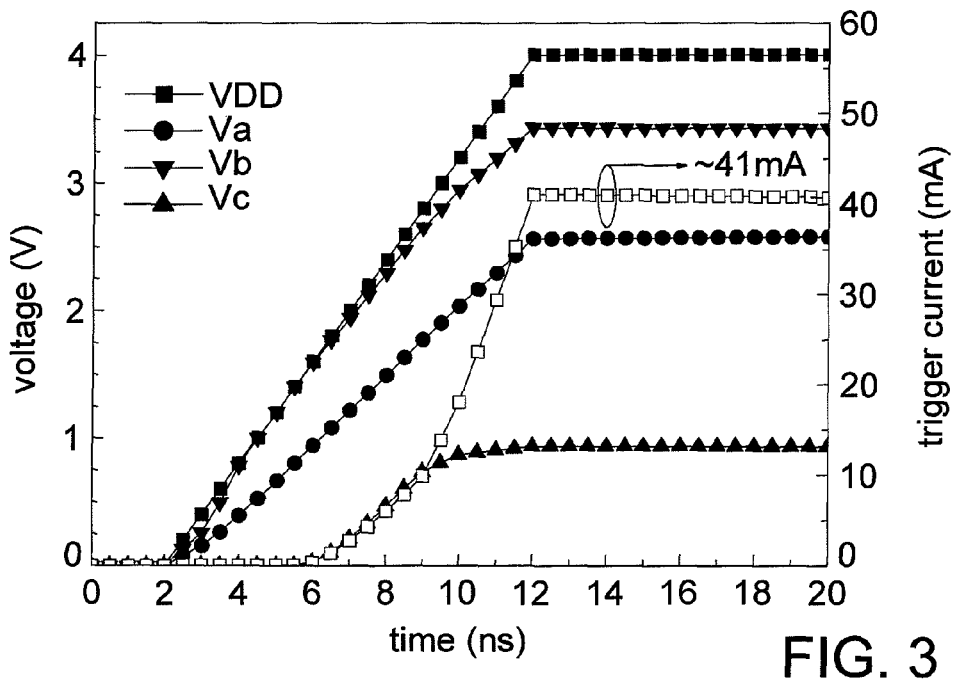
FIG. 3 is a schematic diagram of voltage transients during an ESD event, and voltage transients at the nodes in the ESD protection apparatus during the ESD event.

FIG. 3 shows a schematic diagram of voltage transients during an ESD event, and voltage transients at the nodes in the ESD protection apparatus during the ESD event. In this exemplary embodiment, the ESD event is simulated under conditions that a rise time is 10 ns and a level of a pulse signal increases by 4V.

When the ESD event is provided between the first rail line R1 and the second rail line R2 coupled to the ESD protection apparatus 2 of the embodiment, the supply voltage VDD at the first rail line R1 correspondingly increases from 0V to 4V within 10 ns. Meanwhile, the first parasitic resistance Re1 and the second parasitic resistance Re2 together with the electronic element Dc form an RC delay circuit, so that a voltage changing speed at which the voltage Va at the node Na is lower than a voltage changing speed at which the level of the supply voltage VDD. Thus, when the voltage difference between the supply voltage VDD and the voltage Va exceeds a threshold voltage of the transistor Mp, the transistor Mp is correspondingly turned on to generate a trigger current Ic.

Further, a cross voltage between the nodes Nb and Nc is substantially greater than the conducting voltage Von (e.g., 1.4V) of the level limiting circuit 26. Thus, the level limiting circuit 26 is enabled, and the drain of the transistor Mp is coupled to the drive terminal Nt of the clamp circuit 101 to provide the trigger current Ic for conducting the clamp circuit 101. Accordingly, in response to the trigger current Ic, the clamp circuit 101 is conducted, so that the ESD event between the first rail line R1 and the second rail line R2 can be discharged via the clamp circuit 101.

Figure 4:
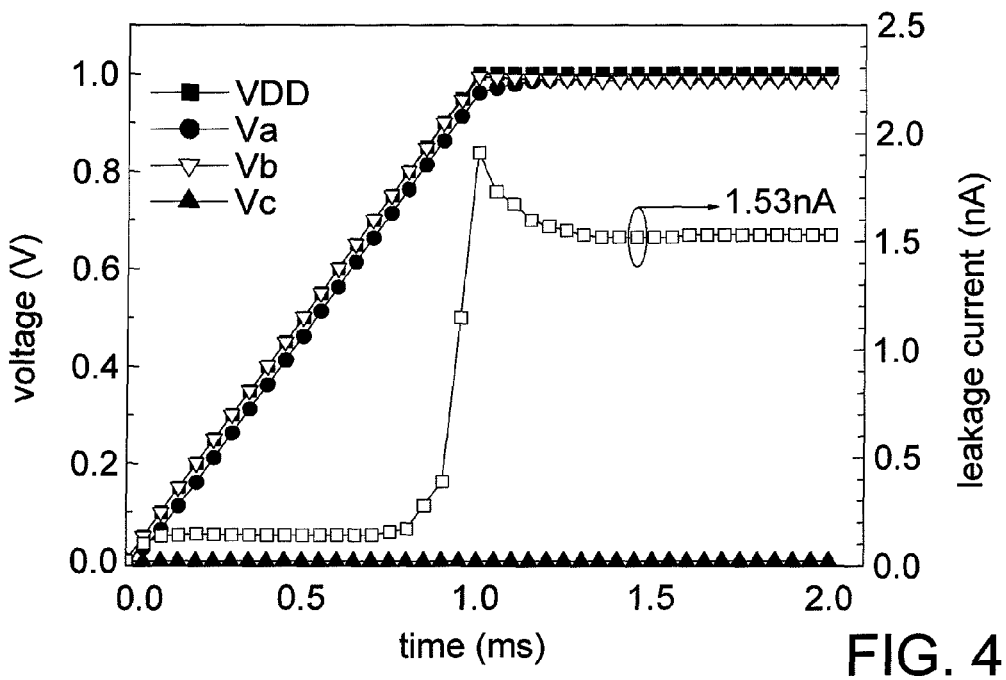
FIG. 4 is a schematic diagram of voltage transients during a normal circuit operation condition, and voltage transients at the nodes in the ESD protection apparatus during the normal circuit operation condition.

FIG. 4 shows a schematic diagram of voltage transients during a normal circuit operation condition, and voltage transients at the nodes in the ESD protection apparatus during the normal circuit operation condition. In this exemplary embodiment, the normal circuit operation condition is simulated under conditions that a rise time is 1 ms and a level of a step signal increases by 1V.

When the normal circuit operation condition in FIG. 4 is provided between the first rail line R1 and the second rail line R2 coupled to the ESD protection apparatus 2 of the embodiment, the supply voltage VDD at the first rail line R1 correspondingly increases from 0V to 1V within 1 ms. Meanwhile, a slight voltage difference is correspondingly generated between the first input and the gate of the transistor Mp. However, since the leakage current IL1 exists between the source and the gate of the transistor Mp, charge at the source of the transistor Mp starts charging the electronic element Dc coupled to the gate of the transistor Mp by the leakage current IL1. As the charge at the source of the transistor Mp charges the electronic element Dc, a charge balance is reached, in which substantially no voltage difference exists between the source and the gate of the transistor Mp, and the transistor Mp then becomes turned-off.

Since no trigger current Ic is generated, the cross voltage between the nodes Nb and Nc is lower than the conducting voltage Von of the level limiting circuit 26, so that the level limiting circuit 26 is also turned off. Hence, the detection circuit 201 substantially stops providing the trigger current Ic such that the clamp circuit 101 is also turned off. Accordingly, with respect to the ESD protection apparatus 2, the current paths between the first rail line R1 and the second rail line R2 are disconnected to prevent the happening of a leakage current between the first rail line R1 and the second rail line R2.

Taking the example in FIG. 4 for instance, the leakage current between the first rail line R1 and the second rail line R2 is merely 1.53 nA.

Figure 5:
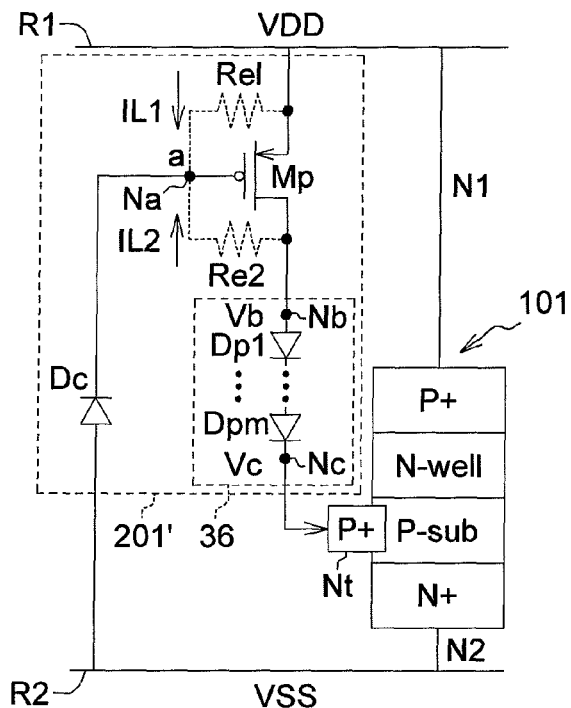
FIG. 5 is another schematic diagram of an ESD protection apparatus according to one exemplary embodiment.
Figure 6:
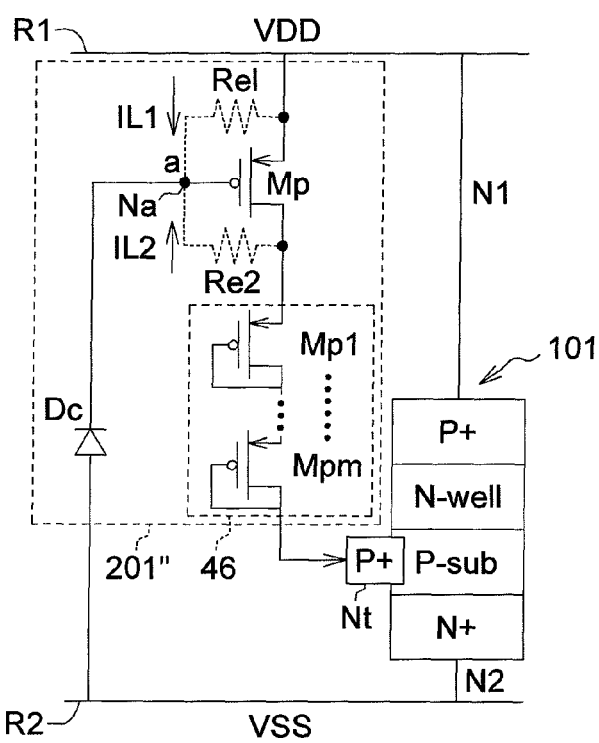
FIG. 6 is another schematic diagram of an ESD protection apparatus according to one exemplary embodiment.
Figure 7:
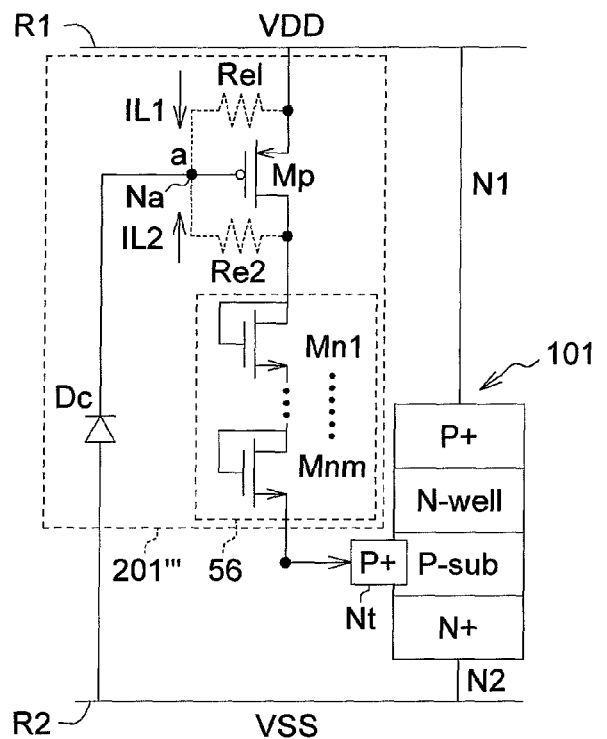
FIG. 7 is yet another schematic diagram of an ESD protection apparatus according to one exemplary embodiment.

In this exemplary embodiment, an example of the level limiting circuit 26 including two diodes is taken for illustrative purposes rather than limiting the ESD protection apparatus of the embodiment therein. In other examples, referring to FIG. 5, a level limiting circuit 36 may also include m diodes Dp1, Dp2 . . . and Dpm, for correspondingly providing different conducting voltages Von in response to different levels of supply voltages VDD, where m is a natural number. Referring to FIGS. 6 and 7, level limiting circuits 46 and 56 may be implemented by at least one MOSFET, for example, be implemented by m P-type MOSFETs Mp1, Mp2 . . . and Mpm, or m N-type MOSFETs Mn1, Mn2 . . . Mnm.

Further, in this exemplary embodiment, an example of the electronic element Dc being implemented by a diode is taken for illustrative purposes rather than limiting the ESD protection apparatus of the embodiment therein. In other examples, the electronic element may be implemented by a metal-insulator-metal (MIM) capacitor circuit, and/or a metal-oxide-metal (MOM) capacitor circuit.

Figure 8:
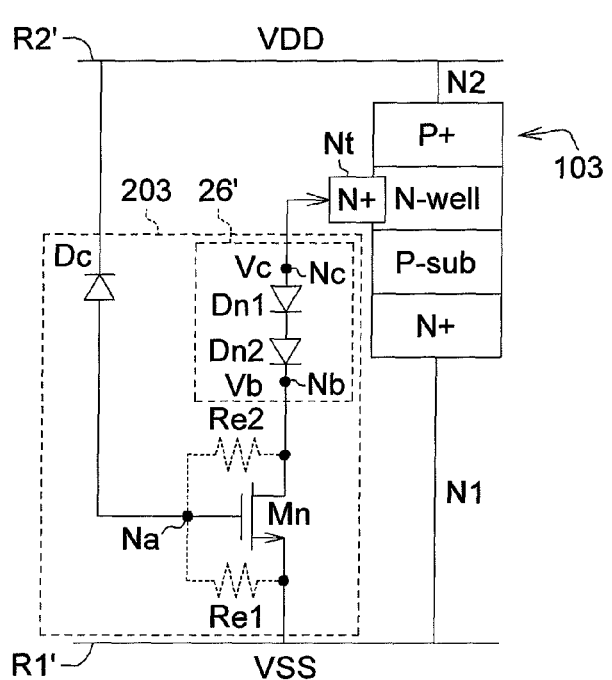
FIG. 8 is a schematic diagram of an ESD protection apparatus according to an exemplary embodiment.

FIG. 8 shows a schematic diagram of an ESD protection apparatus according to a further another exemplary embodiment. For the above exemplary embodiments, a first rail line R1' and a second rail line R2' are for providing supply voltages VSS and VDD. A clamp circuit 103 is also implemented by an SCR. However, the clamp circuit 103 has a first terminal N1 and a second terminal N2 as a cathode and an anode of the SCR. The cathode and the anode of the SCR are respectively coupled to the first rail line R1' and the second rail line R2', and a drive terminal Nt of the SCR corresponds to an N+ doped region. Further, a transistor Mn in a detection circuit 203 is implemented by an N-type MOSFET.

Figure 9:
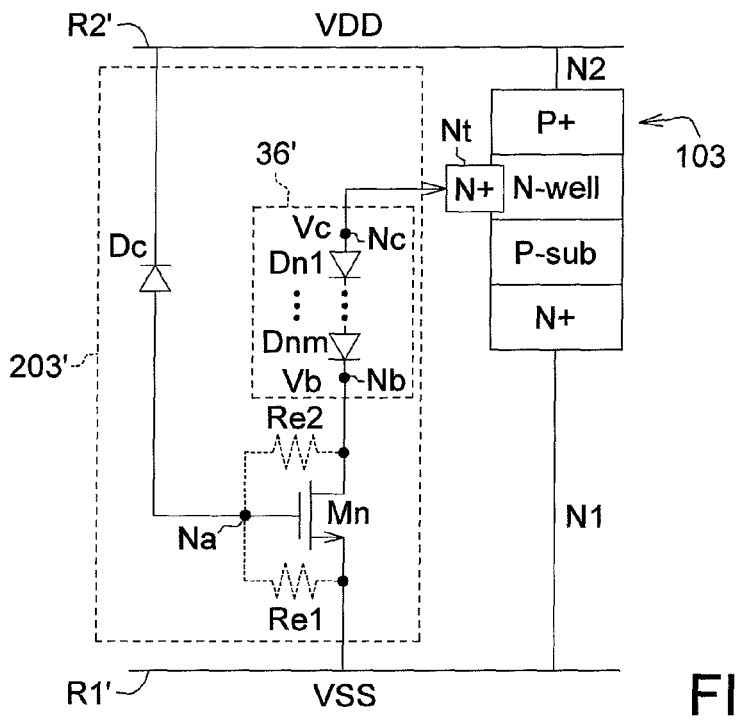
FIG. 9 is another schematic diagram of an ESD protection apparatus according to one exemplary embodiment.
Figure 10:
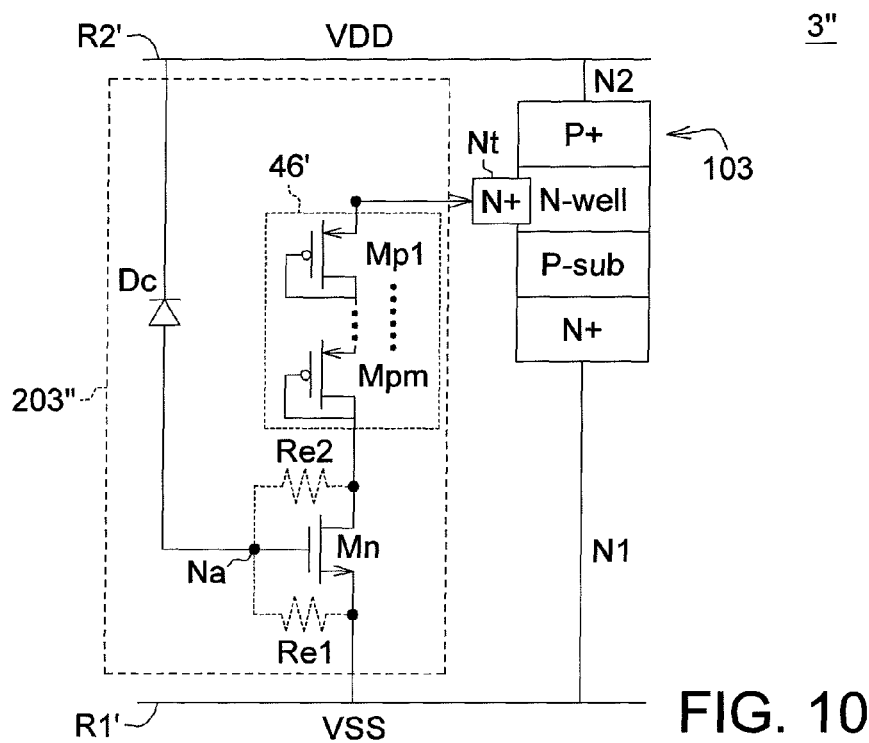
FIG. 10 is another schematic diagram of an ESD protection apparatus according to one exemplary embodiment.
Figure 11:
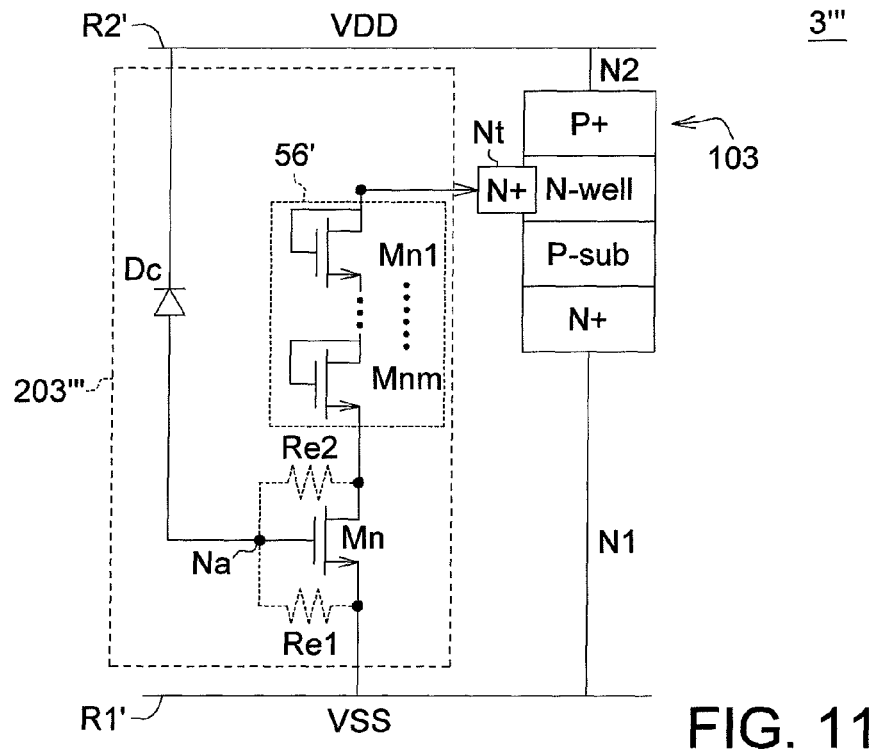
FIG. 11 is yet another schematic diagram of an ESD protection apparatus according to one exemplary embodiment.

In this exemplary embodiment, an example of a level limiting circuit 26' including two diodes is taken for illustrative purposes rather than limiting the ESD protection apparatus of the embodiment therein. In other examples, referring to FIG. 9, a level limiting circuit 36' may also include m diodes Dn1, Dn2 . . . and Dnm, for correspondingly providing different conducting voltages Von in response to different levels of supply voltages VDD, where m is a natural number. Referring to FIGS. 10 and 11, level limiting circuits 46' and 56' may be implemented by m P-type MOSFETs Mp1, Mp2 . . . and Mpm, or m N-type MOSFETs Mn1, Mn2 . . . Mnm.

Further, in this exemplary embodiment, an example of the electronic element Dc being implemented by a diode is taken for illustrative purposes rather than limiting the ESD protection apparatus of the exemplary embodiment therein. In other examples, the electronic element may be an MIM capacitor circuit, and/or an MOM capacitor circuit.

Third Embodiment

Figure 12:
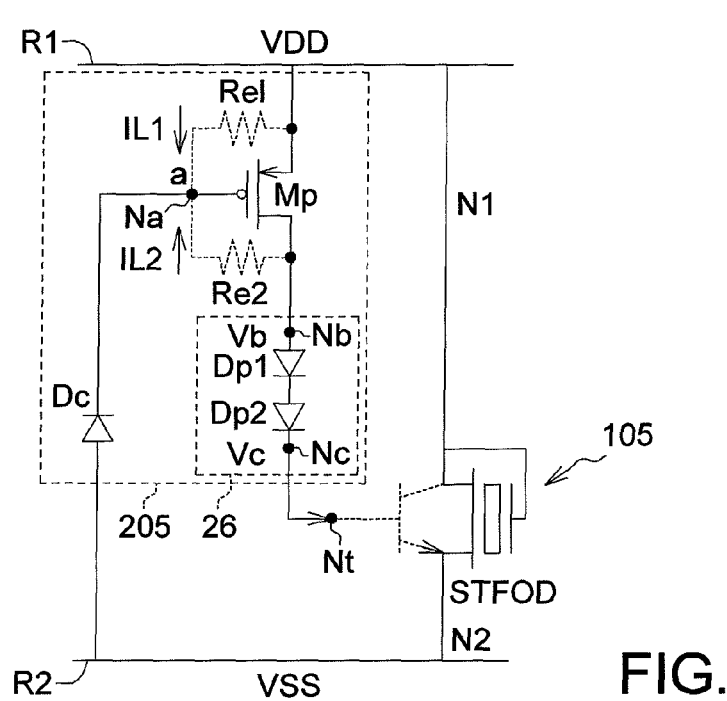
FIG. 12 is a schematic diagram of an ESD protection apparatus according to an exemplary embodiment.

FIG. 12 shows a schematic diagram of an ESD protection apparatus according to a third embodiment. For this exemplary embodiment, a clamp circuit 105 is implemented by a field device.

Figure 13:
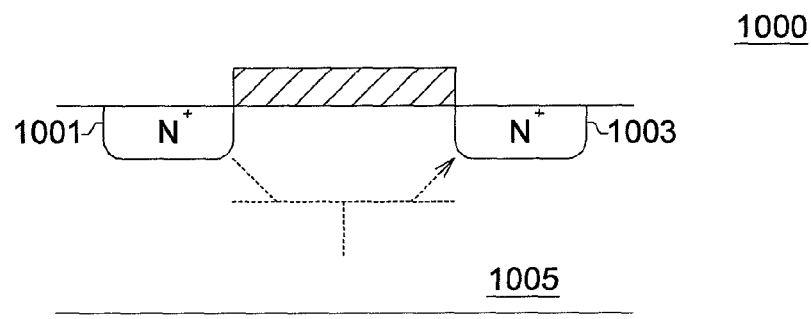
FIG. 13 is a schematic diagram of a clamp circuit 105 in FIG. 12.

FIG. 13 shows a schematic diagram of the clamp circuit 105 in FIG. 12. A field device, having a similar structure as that of a common MOSFET element, includes two N+ doped regions 1001 and 1003 in a P-type substrate 1005 thereof. A node Nc is coupled to the P-type substrate 1005.

Thus, the N+ doped regions 1001 and 1003 together with the P-type substrate 1005 form an equivalent transistor, for example, an NPN parasitic bipolar junction transistor (BJT), which discharges an ESD event in response to a trigger current Ic provided by a detection circuit 205. The BJT has a base, a collector and an emitter respectively coupled to a drive terminal Nt of the clamp circuit 105, the first rail line R1 and the second rail line R2.

Figure 14:
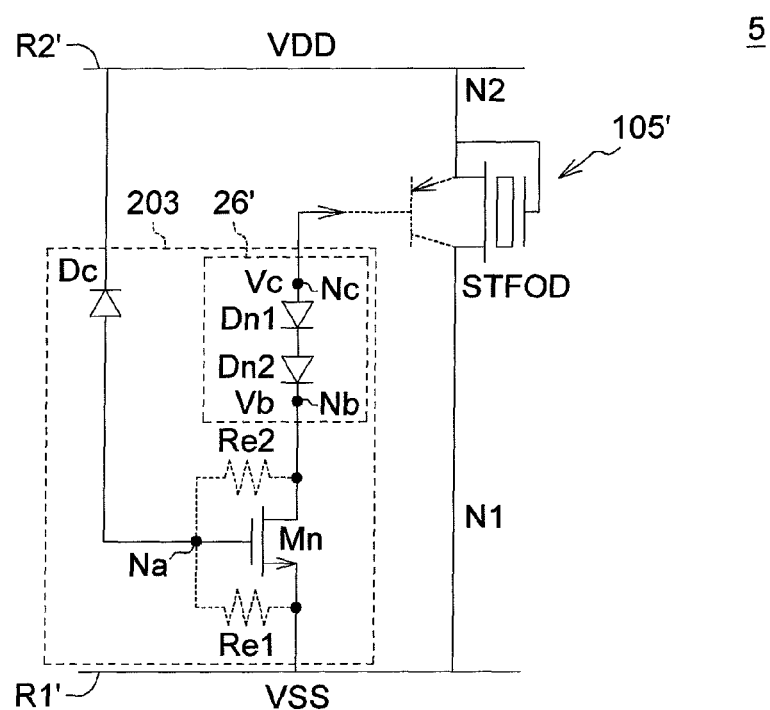
FIG. 14 is another schematic diagram of an ESD protection apparatus according to one exemplary embodiment.

Similarly, the clamp circuit 105 in FIG. 12 may also be implemented by an opposite-polarity structure, as a clamp circuit 105' shown in FIG. 14. Since a structure of an ESD protection apparatus 5 shown in FIG. 14 is similar to that of the ESD protection apparatus 4, and details of the ESD protection apparatus 5 shall be omitted herein.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An electrostatic discharge (ESD) protection apparatus, comprising:
    a clamp circuit, coupled between a first rail line and a second rail line, the first and second rail lines respectively having a first reference voltage and a second reference voltage; and
    a detection circuit, comprising:
    a first node;
    an electronic element, coupled between the first node and the second rail line, having an equivalent capacitance value; and
    a transistor, coupled to the first node;
    wherein, in response to an ESD event triggered between the first and second rail lines, a plurality of leakage currents correspondingly pass between a first input and a gate and between a second input and the gate of the transistor, and respectively in equivalence form a first parasitic resistance and a second parasitic resistance between the first input and the gate and between the second input and the gate; the first parasitic resistance and the second parasitic resistance and the electronic element form a delay circuit to provide a drive voltage between the gate and the first input for conducting the transistor, and to provide a trigger current for conducting the clamp circuit, so that the first and second rail lines perform an ESD operation via the clamp circuit, and the detection circuit further comprises:
    a second node and a third node, respectively coupled to the second input and a drive terminal of the clamp circuit; and
    a level limiting circuit, coupled between the second and third nodes, for determining a conducting voltage, disconnecting the second input from the drive terminal when a cross voltage between the second input and the drive terminal is lower than the conducting voltage, and connecting the second input to the drive terminal when the cross voltage is greater than the conducting voltage, wherein the conducting voltage is associated with a supply voltage.

2. The apparatus according to claim 1, wherein in response to a normal circuit operation condition triggered between the first and second rail lines, the supply voltage is provided between the first and second rail lines.

3. The apparatus according to claim 1, wherein the level limiting circuit comprises at least one diode unit for determining the conducting voltage.

4. The apparatus according to claim 1, wherein the level limiting circuit comprises at least one metal-oxide semiconductor field-effect transistor (MOSFET) for determining the conducting voltage.

5. The apparatus according to claim 1, wherein the electronic element comprises:
    a diode, having a first terminal and a second terminal respectively coupled to the first node and the second rail line, being reverse-biased in response to the ESD event.

6. The apparatus according to claim 5, wherein the first and second reference voltages are respectively a high-level reference voltage and a low-level reference voltage; and the first terminal and the second terminal of the diode are respectively a cathode and an anode.

7. The apparatus according to claim 5, wherein the first and second reference voltages are respectively a low-level reference voltage and a high-level reference voltage; and the first terminal and the second terminal of the diode are respectively an anode and a cathode.

8. The apparatus according to claim 1, wherein the electronic element is a metal-insulator-metal (MIM) capacitor circuit and/or a metal-oxide-metal (MOM) capacitor circuit.

9. The apparatus according to claim 1, wherein the clamp circuit comprises:
    a silicon-controlled rectifier (SCR), having an anode input, a cathode input and a drive terminal, the anode input and the cathode input of a SCR respectively being coupled to one of the first and second rail lines and the other of the two.

10. The apparatus according to claim 1, wherein the clamp circuit comprises:
    a field device, correspondingly forming an equivalent transistor having a base, a collector and an emitter respectively coupled to a drive terminal of the clamp circuit, the first rail line and the second rail line.

11. A method of an ESD protection apparatus, comprising:
    providing a clamp circuit, the clamp circuit coupled between a first rail line and a second rail line, the first and second rail lines respectively having a first reference voltage and a second reference voltage;
    providing a detection circuit, the detection circuit comprising an electronic element coupled to a first node and a transistor, the electronic element having an equivalent capacitance value;
    in response to an ESD event triggered between the first and second rail lines, rendering a plurality of leakage currents to correspondingly pass between a first input and a gate and between a second input and the gate of the transistor, and respectively in equivalence form a first parasitic resistance and a second parasitic resistance between the first input and the gate and between the second input and the gate;
    forming a delay circuit by the first parasitic resistance and the second parasitic resistance and the electronic element to provide a drive voltage between the gate and the first input;
    in response to the drive voltage, conducting the transistor, and providing a trigger current for conducting the clamp circuit, so that the first and second rail lines perform an ESD operation via the clamp circuit;
    providing a second node, a third node and a level limiting circuit in the detection circuit, the second and third nodes respectively being coupled to the second input and a drive terminal of the clamp circuit, the level limiting circuit being coupled between the second and third nodes;

determining a conducting voltage by the level limiting circuit;

disconnecting the second input from the drive terminal by the level limiting circuit when a cross voltage between the second input and the drive terminal is lower than the conducting voltage; and connecting the second input to the drive terminal by the level limiting circuit when the cross voltage between the second input and the drive terminal is greater than the conducting voltage;

wherein the conducting voltage is associated with a supply voltage.

12. The method according to claim 11, further comprising:
in response to a normal circuit operation condition between the first and second rail lines, providing the supply voltage between the first and second rail lines.

13. The method according to claim 11, wherein the level limiting circuit comprises at least one diode unit for determining the conducting voltage.

14. The method according to claim 11, wherein the level limiting circuit comprises at least one MOSFET for determining the conducting voltage.

15. The method according to claim 11, wherein the step of providing the detection circuit further comprises:
providing a diode in the electronic element, the diode having a first terminal and a second terminal respectively coupled to the first node and the second rail line, the diode further being reverse-biased in response to the ESD event.

16. The method according to claim 15, wherein the first and second reference voltages are respectively a high-level reference voltage and a low-level reference voltage; and the first terminal and the second terminal of the diode are respectively a cathode and an anode.

17. The method according to claim 15, wherein the first and second reference voltages are respectively a low-level reference voltage and a high-level reference voltage; and the first terminal and the second terminal of the diode are respectively an anode and a cathode.

18. The method according to claim 11, wherein the step of providing the detection circuit further comprises:
providing an MIM capacitor circuit and/or an MOM capacitor circuit for implementing the electronic element.

19. The method according to claim 11, wherein the step of providing the clamp circuit further comprises:
providing an SCR, the SCR having an anode input, a cathode input and a drive terminal, the anode input and the cathode input of the SCR respectively being coupled to one of the first and second rail lines and the other of the two.

20. The method according to claim 11, wherein the step of providing the clamp circuit further comprises:
providing a field device in the clamp circuit, the field device correspondingly forming an equivalent transistor having a base, a collector and an emitter respectively coupled to a drive terminal of the clamp circuit, the first rail line and the second rail line.

* * * * *